April 6, 1965   E. A. BARTSCH   3,176,776
HELICOPTER ROTOR BLADE
Filed Dec. 17, 1963   2 Sheets-Sheet 1
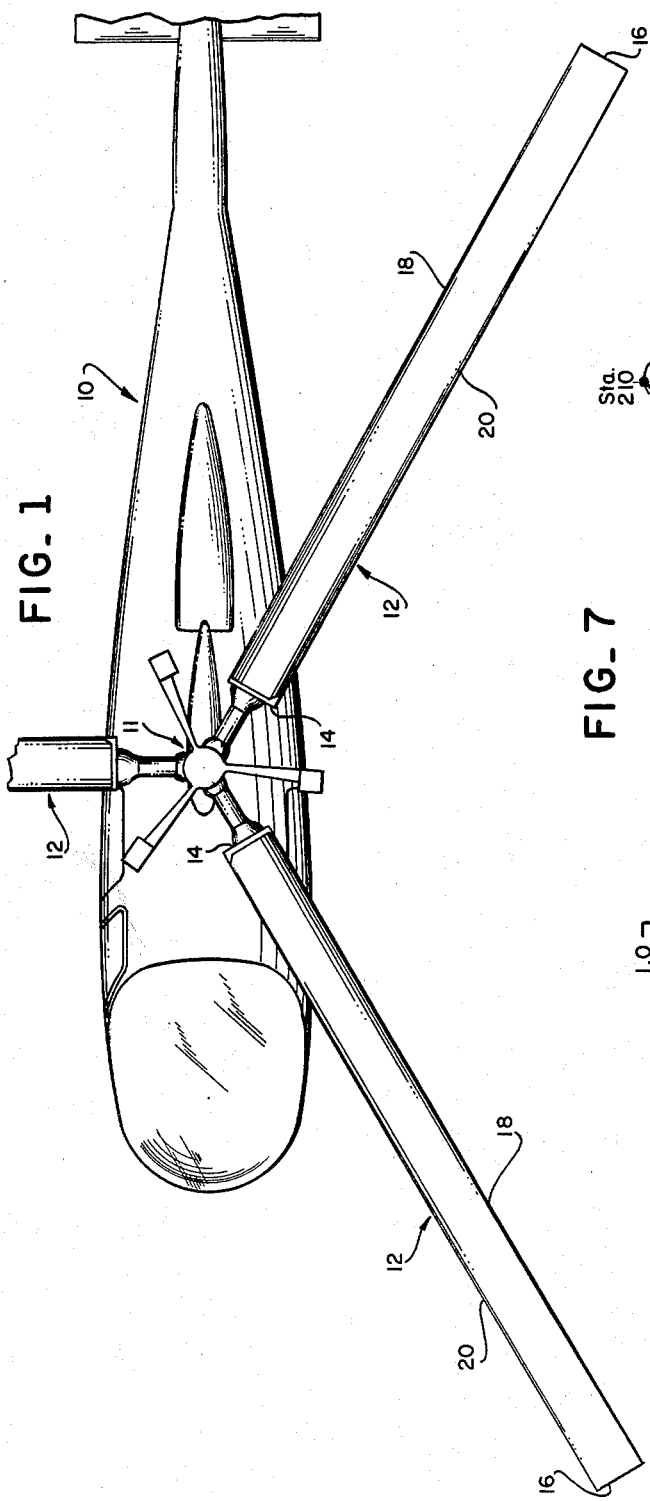
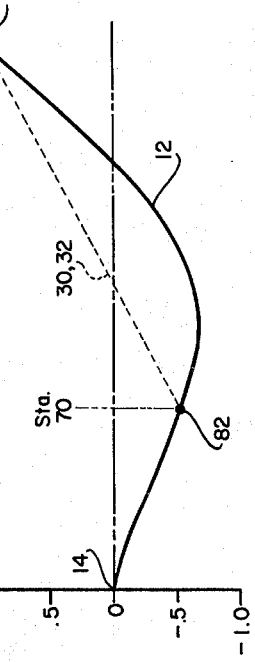
INVENTOR.
EDMUND A. BARTSCH
BY
*George Sullivan*
Agent April 6, 1965 — E. A. BARTSCH — 3,176,776
HELICOPTER ROTOR BLADE
Filed Dec. 17, 1963 — 2 Sheets-Sheet 2
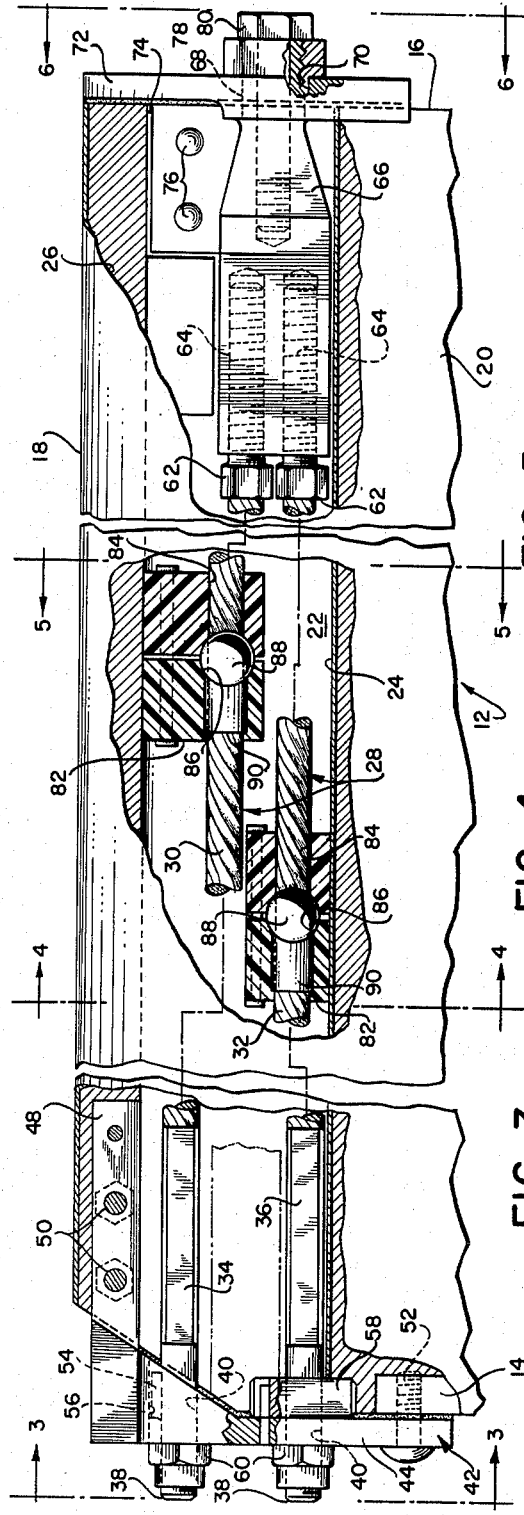
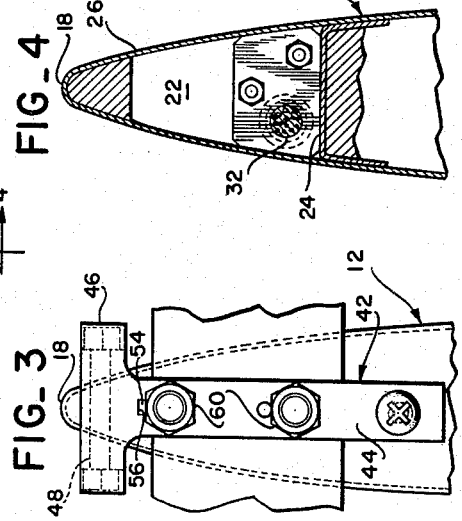
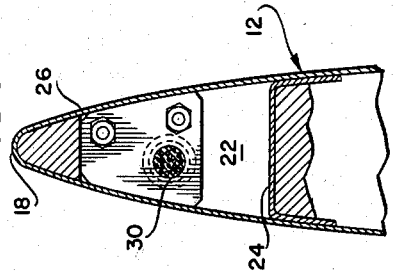
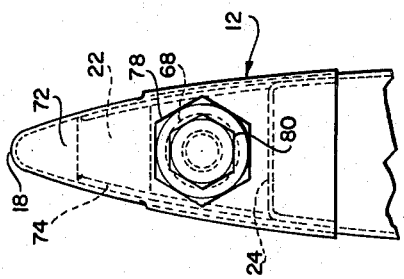
INVENTOR.
EDMUND A. BARTSCH
BY
Agent

United States Patent Office 3,176,776
Patented Apr. 6, 1965

3,176,776
HELICOPTER ROTOR BLADE
Edmund A. Bartsch, Burbank, Calif., assignor to Lockheed Aircraft Corporation, Burbank, Calif.
Filed Dec. 17, 1963, Ser. No. 331,287
3 Claims. (Cl. 170—159)

This invention relates to helicoptor rotor blades and more particularly to preloaded helicopter rotor blades.

As a helicopter rotor blade rotates at its normal rotary speed, it experiences flapwise bending in its second bending mode. If the frequency of this flapwise bending is not properly controlled, an unduly high vibration level is experienced by the helicopter and the rotor blades are subjected to undue stresses.

This may be overcome by the raising or lowering of the blade frequency. Since it requires considerable structural changes in a blade to raise its frequency, it is much simpler to lower the frequency.

It is known to lower the bending frequency of a rotor blade by adding masses at predetermined locations along the blade. While generally satisfactory, this method of lowering rotor blade frequency has certain disadvantages.

One disadvantage resides in the fact that these masses add considerably to the weight of the rotor blade.

Another disadvantage resides in the fact that these masses produce high inertia loads imparting local stresses to the blade.

In view of the foregoing factors and conditions characteristic of methods of lowering the flapwise bending frequency of helicopter rotor blades, it is a primary object of the present invention to provide a new and useful rotor blade not subject to the disadvantages enumerated above and having preloaded cable means applying axial compression forces to the blades.

Another object of the present invention is to provide means for lowering the bending frequency of a helicopter blade in such a manner that a constant compression force between two blade stations is applied in the direction of the blade axis by means of a preloaded cable or strap.

Yet another object of the present invention is to provide a helicopter blade which may be adjusted to reduce vibrations in a helicopter without adding an undue weight penalty to the rotor blade.

A further object of the present invention is to provide a helicopter blade which is preloaded in an axial direction by a constant compression force acting as a negative spring.

According to the present invention, cables are attached between the root and tip sections inside the hollow D-beam area of the helicopter blade leading edge. The cables are preloaded in the axial direction of the blade by a constant compression acting as a negative spring. This negative spring force reduces the effective bending stiffness of the blade which lowers its frequency. The cables are maintained in a predetermined position in the axis of the blade by spacers to prevent the cables from slapping against the walls of the blade. The cables and spacers incorporate a minimum weight penalty compared to the weight added by masses with prior art teachings.

The frequency of the flapwise bending of the rotor blade can be varied in a wide range by choosing the right location for the spacers and the proper magnitude of the preload.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a plan view of a helicopter employing rotor blades of the present invention;

FIGURE 2 is a plan view, on an enlarged scale, of one of the rotor blades of FIGURE 1 with parts broken away to show internal construction;

FIGURE 3 is an end view taken along line 3—3 of FIGURE 2;

FIGURE 4 is a cross-sectional view taken along line 4—4 of FIGURE 2;

FIGURE 5 is a cross-sectional view taken along line 5—5 of FIGURE 2;

FIGURE 6 is an end view taken along line 6—6 of FIGURE 2; and

FIGURE 7 is a graph of the second bending mode of the blade of FIGURE 2.

Referring again to the drawings, a helicopter 10 includes a rotor 11 having a plurality of rotor blades 12 constituting a preferred embodiment of the present invention.

Each rotor blade 12 includes a root portion 14, a tip 16, a leading edge 18 and a trailing edge 20.

Upon rotation of the rotor 11, the blades 12 may experience the vertical bending mode shown graphically in FIGURE 7. As the frequency of this bending mode of a rotating rotor blade 12 approaches resonance or the excitation frequency of the blade, the response in flapwise bending of the blade 12 is high resulting in high blade stresses and high vibration levels in the helicopter 10. The blade 12, however, may be "detuned" with the cable arrangement shown in FIGURE 2.

The leading edge 18 of the blade 12 has a D-shaped passageway 22 formed by a shear web 24 and the outer skin 26 of the blade 12. A constant-compression force means 28 may be mounted in the passageway 22 to place the blade 12 under a preload by connecting the means 28 to the root 14 and the tip 16 and then placing the means 28 under a suitable amount of tension. This applies a constant compression force in the direction of the longitudinal axis of the blade 12. The axial compression force acts as a negative spring and lowers the bending frequency of blade 12. The constant-compression force means 28 includes, for example, a forward cable assembly 30 and an aft cable assembly 32. It is to be noted that a strap or straps may be employed as the constant-compression force means rather than a cable or cables as illustrated.

The cables 30 and 32 are respectively connected to the root 14 of blade 12 by a forward fitting 34 and an aft fitting 36. The fittings 34 and 36 each have an externally threaded portion 38 which passes through an aperture 40 in a root cap 42.

The root cap 42 is T-shaped having a leg 44 and a cross arm 46. The cross arm 46 includes a pair of rearwardly extending legs 48 which straddle the blade 12 adjacent its leading edge 18. The root cap 42 is secured in position on the end of blade 12 by a plurality of bolts 50 which pass through the rearwardly extending legs 48 and by a screw 52 which passes through the leg 44. The fitting 34 is prevented from rotating by a tang 54 which slidably engages a slot 56 in the cap 42. The fitting 36 is prevented from rotating by a flat portion 58 which abuts the shear web 24.

A pair of nuts 60 threadedly engage the threaded ends 38 of the fittings 34 and 36 and may be tightened to place the cables 30 and 32 under a predetermined amount of tension.

The ends of the cables 30 and 32 which are remote from the root 14 are each affixed to a separate fitting 62 having external threads 64 which threadedly engage a fitting 66. The fitting 66 has an end 68 which is both externally and internally threaded. The end 68 passes through an aperture 70 in an end cap 72. The cap 72 includes a doubler member 74 which is inserted into passageway 22 and is riveted to skin 26 by rivets 76. A nut 78 threadedly engages the externally threaded portion of end 68 and may be tightened to add additional tension jointly to the cables 30 and 32. A cap screw 80 may then be threaded into the internally threaded portion of end 58 to prevent the nut 78 from becoming loosened.

The cables 30 and 32 are prevented from slapping against skin 26 of blade 12 by placing spacers 82 in the passageway 22 at suitable stations, such as at station 70 (FIG. 7), along the length of the blade 12. Each spacer 82 includes a passageway 84 through which a respective cable passes. The passageways 84 are intersected with spherical bores 86 which are engaged by ball ends 88 having shank portions 90 clamped to the cables 30 and 32. The spacers 82 are free to slide within passageway 22 so that they will move with cables 30 and 32 as they are tightened.

The cables 30 and 32 are tightened sufficiently that a constant compression force is maintained between two blade stations in the direction of the blade axis of a magnitude which will lower the blade frequency. The tightening of the cables may be readily adjusted to set the preload to a selected amount.

In actual practice, a 210-inch blade having a frequency of 17.2 c.p.s. or 2.9/rev. was preloaded in an axial direction by a constant compression force by tensioning two cables (¼ in. dia.) to a static preload of 7000 lbs. The spacers were placed at station 70 giving the cables an effective length of 140 inches. The frequency of the second bending mode of the rotating blade dropped to 15.1 c.p.s. or 2.5/rev. This is well below the 3/rev. excitation frequency of the blade.

While the particular rotor blade herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. A helicopter rotor blade comprising:
    (a) a skin portion defining a leading edge, a tracking edge, a root and a tip;
    (b) a shear web mounted in said skin portion and extending from said root to said tip;
    (c) a fore and an aft cable mounted axially within said skin portion adjacent said leading edge and said shear web, respectively;
    (d) a root cap connecting one end of said cable means to said root;
    (e) an end cap connecting the other end of said cable means to said tip; and
    (f) cable tensioning means connected to said cables for determinably maintaining a constant compression force between two chordwise stations in said rotor blade and for lowering the bending frequency thereof.

2. The rotor blade of claim 1 including a spacer connected to each cable for preventing said cables from slapping against said skin portion and said shear web.

3. The rotor blade of claim 2, wherein said cable tensioning means comprises:
    (a) first and second externally threaded fittings connected to one end of said fore and aft cables, respectively, said first and second fittings being slidably mounted in said root cap;
    (b) first and second internally threaded nuts threadedly engaging said first and second fittings and bearing against said root cap;
    (c) a third externally threaded fitting connected to the other ends of said fore and aft cables and slidably engaging said end cap; and
    (d) a third internally threaded nut threadedly engaging said third fitting and bearing against said end cap, whereby said third nut may be tightened against said end cap to tension said cables said predetermined amounts.

References Cited by the Examiner

UNITED STATES PATENTS

| | | | |
|---|---|---|---|
| 1,884,598 | 10/32 | La Cierva | 170—160.55 |
| 2,712,356 | 7/55 | Jovanovich | 170—159 |
| 2,951,542 | 9/60 | Stulen et al. | 170—159 |
| 2,955,662 | 10/60 | Bonnett et al. | 170—159 |
| 2,961,053 | 11/60 | Prewitt et al. | 170—159 |

JULIUS E. WEST, *Primary Examiner.*